United States Patent [19]

McWhirter

[11] 4,014,391

[45] Mar. 29, 1977

[54] COMBINATION DIGGER, TRIMMER, AND EDGER TOOL

[76] Inventor: Olin P. McWhirter, P.O. Box No. 5, Greenville, Tex. 75401

[22] Filed: Jan. 2, 1976

[21] Appl. No.: 646,360

[52] U.S. Cl. .................. 172/13; 172/18; 172/375; 172/381; D8/7; D8/11
[51] Int. Cl.² ............... A01B 1/20; A01G 3/06
[58] Field of Search .......... 172/13, 14, 371, 375, 172/381; D8/7, 9, 10, 11

[56] References Cited

UNITED STATES PATENTS

| | | | |
|---|---|---|---|
| 394,641 | 12/1888 | Cartwright | 172/381 |
| 908,266 | 12/1908 | Jackson | 172/375 |
| 1,175,860 | 3/1916 | Babedreer | 172/381 |
| 1,595,821 | 8/1926 | Buffington | 172/381 |
| 1,659,944 | 2/1928 | Dome | 172/381 |
| 1,739,489 | 12/1929 | Wagner | 172/381 |
| D34,966 | 8/1901 | Maurer | D8/11 |

Primary Examiner—Paul E. Shapiro
Attorney, Agent, or Firm—Fishburn, Gold & Litman

[57] ABSTRACT

A combination digger, trimmer, and edger tool has first and second blade portions mounted on and extending in opposite directions from one end of an elongated handle member and each having a respective cutting edge on the free end thereof. A side blade member is mounted on and extends laterally from and substantially normal to one of the first and second blade portions and has a cutting edge thereon adapted to trim or edge vegetation.

8 Claims, 6 Drawing Figures

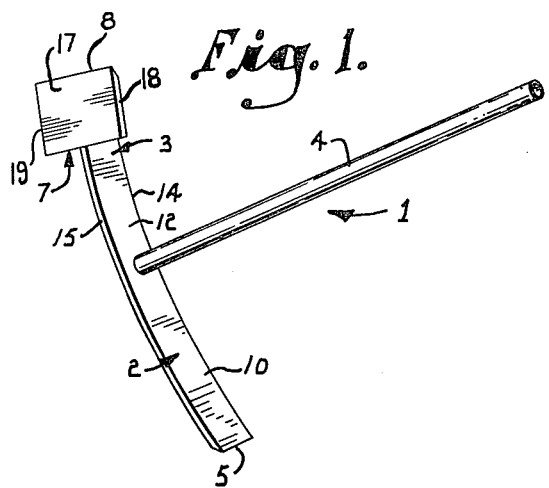
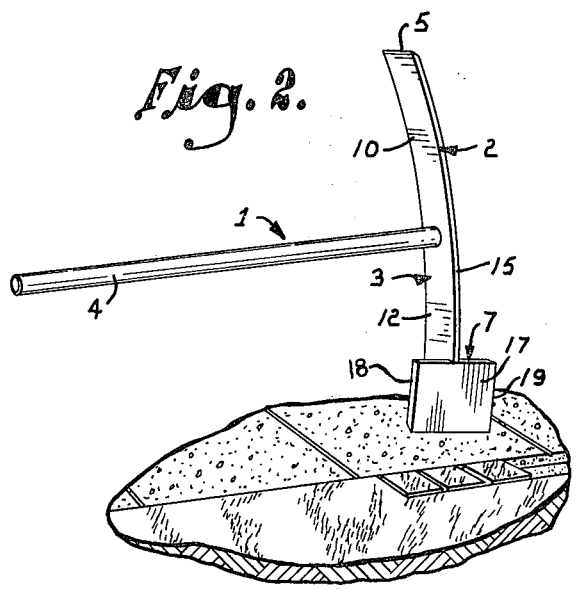
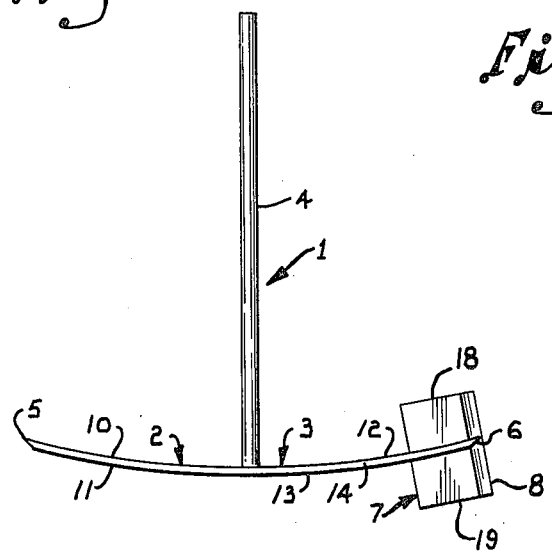
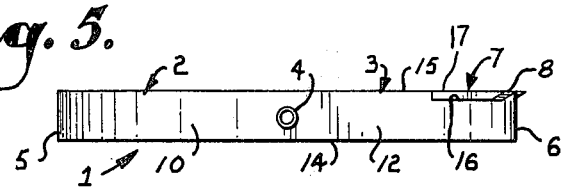
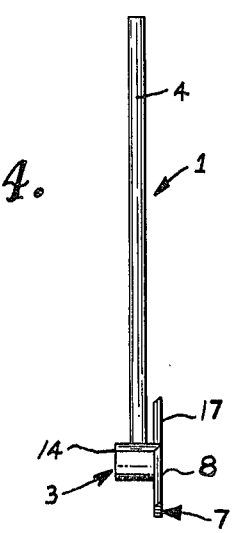
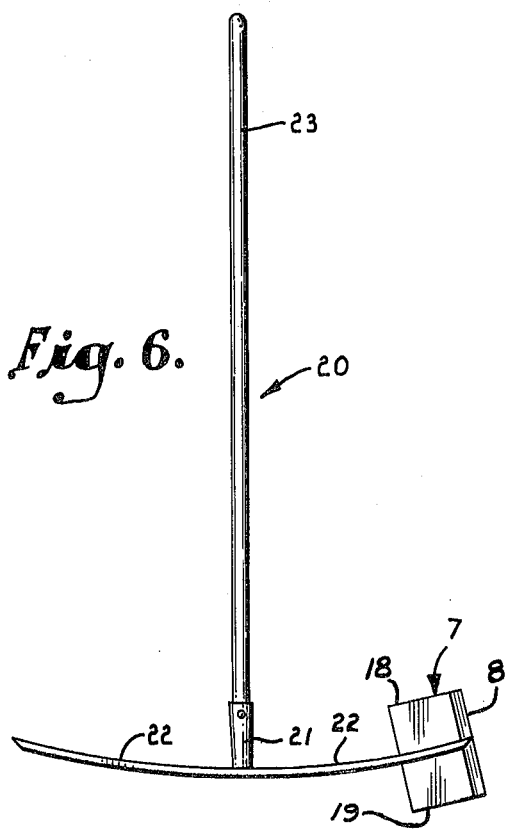

COMBINATION DIGGER, TRIMMER, AND EDGER TOOL

The present invention relates to garden tools and, more particularly, to a combination digger, trimmer, and edger tool adapted for digging, trimming, and edging of lawns of grass and/or other vegetation growing adjacent sidewalks, curbs, drives, flower beds, fences, and the like.

The principal objects of the present invention are: to provide a combination digger, trimmer, and edger tool having a blade portion adapted for digging into a ground surface to form a trench and trim the vegetation along a side thereof; to provide such a tool with a second blade for digging into a ground surface with a minimum of effort and at a greater depth than a conventional hoe to thereby prepare the soil to receive fertilizer, organic matter, and the like, at any desired depth and which insures better plant growth and production; to provide such a tool adapted for digging, trimming, and edging of lawns of grass and/or other vegetation growing adjacent sidewalks, curbs, drives, patios, flower beds, fences, and the like; to provide such a tool wherein a blade portion has a side blade and each stroke of the tool cuts a narrow trench adjacent the walk, curb, patio, drive, flower bed, fence line, or the like, and the side blade trims and cuts grass and other vegetation; to provide such a tool wherein drawing the tool through a previously cut trench effects removal of a narrow strip of the sod or the like; to provide such a tool for forming a trimmed edge trench or strip of lower level than adjacent sod or vegetation whereby mowing with one mower wheel in said trench will aid in keeping the adjacent vegetation from growing thereover; to provide such a tool adapted to have movement thereof accurately and precisely controlled during use; to provide such a tool wherein the use thereof once early in the growing season will be sufficient to keep vegetation trimmed for the entire growing season; and to provide such a combination digger, trimmer, and edger tool which is durable in construction, easy to maneuver, attractive in appearance, positive in use, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the combination digger, trimmer, and edger tool.

FIG. 1 is a perspective view of a combination digger, trimmer, and edger tool embodying features of the present invention and shown in digging position.

FIG. 2 is a perspective view of the combination digger, trimmer, and edger tool shown in trimming and edging position.

FIG. 3 is a side elevational view of the combination digger, trimmer, and edger tool.

FIG. 4 is an end elevational view of the combination digger, trimmer, and edger tool.

FIG. 5 is a top plan view of the combination digger, trimmer, and edger tool.

FIG. 6 is a side elevational view of a modified combination digger, trimmer, and edger tool.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a combination digger, trimmer, and edger tool which in the illustrated structure, has first and second blade portions 2 and 3 mounted on and extending in opposite directions from one end of an elongated handle member 4 connected to the blade in any suitable or conventional manner. The first and second blade portions 2 and 3 have cutting edges 5 and 6 on the respective free end thereof. A side blade member 7 is mounted on and extends laterally from and substantially normal to one of the first and second blade portions 2 and 3 and has a cutting edge 8 thereon adapted to cut sod and trim vegetation. While the tool is illustrated as having the blade with first and second portions it is to be understood that a digger trimmer edger having only the handle and second blade with the side blade portion will perform the digging of a trimmed side trench.

The handle 4 may be made or formed of any suitable material, such as metal or wood. When the handle 4 is formed of metal, such as a tubular member or pipe, one end thereof may be welded to the first and second blade portions 2 and 3.

The handle 4 may be any desired length, such as a short length of approximately 20 inches which can be used by an operator while sitting or squatting adjacent the site of the operation. A longer handle is suitable for use by the operator while standing. It has been found that the short handle provides the operator more and better control of the tool 1 and the operator can maneuver the tool 1 with complete accuracy and precision. The short handle is illustrated in FIGS. 1 to 5 inclusive.

The first and second blade portions 2 and 3 are preferably a single member which is of a suitable metal, such as shovel steel, spring steel, or a suitable alloy of iron that will retain a sharp edge for durability in use and for long life. The total length of the first and second blade portions 2 and 3 preferably is approximately 12 inches and the combined blade member preferably is approximately 1¾ inch wide. In the illustrated structure, the first and second blade portions 2 and 3 define an arcuate member which has substantially parallel side edges and is concave with the center thereof connected to the one end of the handle 4 whereby downward and forward movement of the handle 4 effects penetration of the cutting edge of one of the first and second blade portions 2 and 3.

The cutting edge 5 on the first blade portion 2 is formed by bevelling and tapers toward a first or upper surface 10 from a second or lower surface 11 of the first blade portion 2. The first or upper surface 10 is facing or toward the handle 4 whereby the cutting edge 5 is toward or closest to the handle 4.

The cutting edge 6 on the second blade portion 3 is also formed by bevelling and tapers toward a first or upper surface 12 from a second or lower surface 13 of the second blade portion 3. The first or upper surface 12 is facing or toward the handle 4 whereby the cutting edge 6 thereof is toward or closest to the handle 4 whereby the curvature of the respective blade portion and the location and shape of the respective cutting edge helps to force the respective blade portion into the ground or sod.

The second blade portion 3 has opposite side edges 14 and 15. One of the opposite side edges, for example side edge 15, has a recess or notch 16 therein. The recess or notch 16 is preferably positioned adjacent the cutting edge 6 of the second blade portion 3 and the handle 4. The notch 16 is adapted to receive the side blade member 7 therein, whereby the initial ground or sod cut to form a trench is made by the cutting edge 6 of the second blade portion 3 and trimming at a side of the trench is by the cutting edge 8 of the side blade member 7.

The side blade member 7 has one surface 17 thereof flush with the side edge 15 of the second blade portion 3 whereby the side blade member 7 is positioned within the cut made by the cutting edge 6 of the second blade portion 3. The cutting edge 8 of the side blade 7 is preferably formed by bevelling the edge portion toward said one surface 17 so the edge 8 is in the plane of the surface 17 and the side edge 15 whereby the sod or vegetation is trimmed or cut in a straight line with the side of the trench or lowered level formed by the tool.

The side blade member 7 has a first or upper end 18 thereof spaced from the upper or first surface 12 of the second blade portion 3. The side blade 7 has a second or lower end 19 thereof spaced from the second or lower surface 13 of the second blade portion 3 whereby the depth of cut of the tool 1 is determined by the spacing between the lower end 19 of the side blade 7 and the lower surface 13 of the second blade portion 3.

The cutting edge 8 of the side blade member 7 is preferably adjacent the cutting edge 6 of the second blade portion 3. The cutting edge 8 is formed on a side edge of side blade member 7 and extends from the upper end 18 thereof to the lower end 19 thereof. The cutting edge 8 is substantially coplanar with the cutting edge 6 whereby the cutting edge 8 of the side blade member 7 enters the ground or sod at substantially the same time as the cutting edge 6 of the second blade portion 3.

The first blade portion 2 is adapted for preliminary cutting in forming a trench and the second blade portion is used for providing a finished trench with a trimmed straight edge. The first blade portion 2 also is adapted for use when digging in a ground surface, such as preparing same for planting, applying fertilizer thereto, inserting organic material into the soil for building humus, and the like. The second blade portion 3 is adapted for removing a narrow and shallow trench of sod or soil and is best used in relatively short shallow strokes. The side blade member 7 defines a neat trim line to the trench formed by the second blade portion 3.

FIG. 6 illustrates a modified combination digger, trimmer, and edger tool 20 having a shank or frog 21 suitably secured to a modified blade member 22, as by welding, and adapted to receive and mount therein one end of a long wood handle member 23. The modified tool 20 is used in substantially the same manner as the tool 1 illustrated in FIGS. 1 to 5 inclusive.

The modified blade member 22 extends from the handle 23 and is an arcuate member and has substantially parallel side edges and is concave between the handle 23 and the free end thereof. A side blade member 7 is illustrated as being mounted on the blade member 22 in a manner and at a position substantially similar to the mounting of the side blade member 7 on the second blade portion 3. The side blade member 7 may be mounted on either side or on both sides of the blade member 22.

It is to be understood that while I have illustrated and described certain forms of my invention, it is not to be limited to these specific forms or arrangement of parts herein described and shown.

What I claim and desire to secure by Letters Patent is:

1. A combination digger, trimmer, and edger tool comprising:
   a. an elongated handle member having opposite end portions;
   b. a blade member mounted on and extending from one end portion of said handle member, said blade member terminating at a free end with a cutting edge thereon, said blade member having a first surface and a second surface; and
   c. a side blade member mounted on and extending from said blade member, and having a cutting edge thereon for cutting vegetation, said side blade member having opposite ends each spaced from a respective one of said first and second surfaces of said blade member, said cutting edge on said side blade member cooperating with the cutting edge on said blade member to define a T-shaped cutting edge.

2. A combination digger, trimmer, and edger tool comprising:
   a. an elongated blade member having opposite end portions each having a respective cutting edge thereon, said blade member having a center portion and opposite side edges and being longitudinally arcuate, said blade member having a first surface and a second surface;
   b. an elongated handle member having opposite end portions;
   c. means on the center portion of said elongated blade member for mounting one of the opposite end portions of said handle member thereon; and
   d. a side blade member secured on said elongated blade member and extending from said elongated blade member, opposite ends and having opposite side edges extending therebetween, one of said opposite side edges having a cutting edge thereon for cutting vegetation, said side blade cutting edge being adjacent the cutting edge of a respective one of the opposite end portions of said blade member, said opposite ends of said side blade member being spaced respectively from said first and second surfaces of said blade member.

3. A combination digger, trimmer, and edger tool as set forth in claim 2 wherein:
   a. one of the side edges of said blade member has a recess therein with said side blade member received therein; and
   b. said side blade member has one surface thereof flush with one side edge of said elongated blade member.

4. A combination digger, trimmer, and edger tool as set forth in claim 3 wherein:
   a. one of the side edges of said side blade member is facing said handle and the other side edge thereof is facing the adjacent end portion of said elongated blade member; and b. the cutting edge of said side blade member is formed on the other side edge of said side blade member.

5. A combination digger, trimmer, and edger tool comprising:
   a. an elongated handle member having opposite end portions;
   b. a blade member mounted on one end portion of said handle member, said blade member having a first portion extending laterally from said one end portion of said handle member and having a free end with a cutting edge thereon, said blade member having a second portion extending laterally from said one end portion of said handle member and having a free end with a cutting edge thereon, said second portion being in opposed relation with said first portion of said blade member, said second portion of said blade member having opposite side edges, one of said side edges of said second portion of said blade member having a recess therein; and
   c. a side blade member mounted on and extending laterally from said blade member and having a cutting edge thereon for cutting vegetation, said side blade member being received in said recess in said one side edge of said blade member second portion, said side blade member having one surface thereof flush with the one side edge of said second portion of said blade member.

6. A combination digger, trimmer, and edger tool comprising:
   a. an elongated handle member having opposite end portions;
   b. a blade member mounted on one end portion of said handle member, said blade member having a first portion extending laterally from said one end portion of said handle member and having a free end with a cutting edge thereon, said blade member having a second portion extending laterally from said one end portion of said handle member and having a free end with a cutting edge thereon, said second portion being in opposed relation with said first portion of said blade member, said second portion of said blade member having opposite side edges, said second portion of said blade member having a first surface and a second surface; and
   c. a side blade member mounted on and extending laterally from said blade member and having a cutting edge thereon for cutting vegetation, said side blade member being mounted on said second portion of said blade member, said side blade member being positioned adjacent said cutting edge on said second portion of said blade member, said side blade member having one surface thereof flush with one of the side edges of said second portion of said blade member, said side blade member having opposite ends thereof spaced respectively from said first and second surfaces of said second portion of said blade member, said side blade member having first and second side edges each extending between said opposite ends thereof, one of said first and second side edges of said side blade member being substantially coplanar with the cutting edge of said second portion of said blade member and having said side blade member cutting edge thereon.

7. A combination digger, trimmer, and edger tool comprising:
   a. an elongated handle member having opposite end portions;
   b. a blade member mounted on one end portion of said handle member, said blade member having a first portion extending laterally from said one end portion of said handle member and having a free end with a cutting edge thereon, said blade member having a second portion extending laterally from said one end portion of said handle member and having a free end with a cutting edge thereon, said second portion being in opposed relation with said first portion of said blade member, said second portion of said blade member having opposite side edges and a first surface and a second surface, one of said side edges of said second portion of said blade member having a recess therein; and
   c. a side blade member mounted on and extending laterally from said blade member and having a cutting edge thereon for cutting vegetation, said side blade member being received in said recess in said one side edge of said blade member second portion, said side blade member having one surface thereof flush with the one side edge of said second portion of said blade member, said side blade member having opposite ends, said side blade member having at least one of said opposite ends thereof spaced from a respective one of said first and second surfaces of said second portion of said blade member.

8. A combination digger, trimmer, and edger tool comprising:
   a. an elongated handle member having opposite end portions;
   b. a blade member mounted on and extending from one end portion of said handle member, said blade member terminating at a free end with a cutting edge thereon, said blade member having opposite side edges, one of said side edges of said blade member having a recess therein; and
   c. a side blade member mounted on and extending from said blade member and having a cutting edge thereon for cutting vegetation, said side blade member being received in said recess in said one side edge of said blade member, said cutting edge on said side blade member cooperating with the cutting edge on said blade member to define a T-shaped cutting edge.

* * * * *